United States Patent
Luo et al.

(10) Patent No.: US 11,805,548 B2
(45) Date of Patent: Oct. 31, 2023

(54) SUPPORTING UL LBT STATUS REPORT IN NR-U

(71) Applicant: QUALCOMM Incorporated, San Diego, CA (US)

(72) Inventors: Jianghong Luo, Skillman, NJ (US); Jing Sun, San Diego, CA (US); Xiaoxia Zhang, San Diego, CA (US); Navid Abedini, Basking Ridge, NJ (US); Naeem Akl, Somerville, NJ (US); Tao Luo, San Diego, CA (US); Luca Blessent, Whitehouse Station, NJ (US); Karl Georg Hampel, Hoboken, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/224,031

(22) Filed: Apr. 6, 2021

(65) Prior Publication Data

US 2022/0322428 A1 Oct. 6, 2022

(51) Int. Cl.
*H04W 74/08* (2009.01)
*H04W 72/1268* (2023.01)
*H04W 72/23* (2023.01)

(52) U.S. Cl.
CPC ... *H04W 74/0808* (2013.01); *H04W 72/1268* (2013.01); *H04W 72/23* (2023.01)

(58) Field of Classification Search
CPC ............. H04W 72/14; H04W 72/1268; H04W 74/0808
See application file for complete search history.

(56) References Cited

U.S. PATENT DOCUMENTS

| | | | |
|---|---|---|---|
| 2020/0314889 A1* | 10/2020 | Cirik ..................... | H04W 72/14 |
| 2020/0404673 A1* | 12/2020 | Zhu ....................... | H04L 5/0092 |
| 2021/0153245 A1* | 5/2021 | Tooher ................. | H04W 72/046 |
| 2021/0392679 A1* | 12/2021 | Kim ..................... | H04W 74/008 |
| 2021/0400719 A1* | 12/2021 | Oh ........................ | H04L 1/1812 |
| 2022/0201747 A1* | 6/2022 | Tooher .............. | H04W 74/0808 |

* cited by examiner

*Primary Examiner* — Kevin M Cunningham
(74) *Attorney, Agent, or Firm* — Procopio, Cory, Hargreaves & Savitch

(57) ABSTRACT

This disclosure provides systems, devices, apparatus, and methods, including computer programs encoded on storage media, for UL LBT status reporting. A scheduled node (e.g., a UE) may sense a status of each LBT channel in a set of one or more LBT channels. The set of one or more LBT channels may include at least one of one or more first LBT channels associated with a scheduling grant or one or more second LBT channels unassociated with the scheduling grant. The scheduled node may transmit, to a scheduling node (e.g., a base station), a LBT status report indicative of the status of each LBT channel in the set of one or more LBT channels. The scheduling node may schedule, via a second scheduling grant, a second set of one or more LBT channels based on the status of each LBT channel indicated in the LBT status report.

26 Claims, 9 Drawing Sheets

SUPPORTING UL LBT STATUS REPORT IN NR-U

BACKGROUND

Technical Field

The present disclosure relates generally to communication systems, and more particularly, to uplink (UL) listen before talk (LBT) status reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a first aspect of the disclosure, a method, a computer-readable medium, and an apparatus are provided. The apparatus may sense a status of each listen before talk (LBT) channel in a set of one or more LBT channels, the set of one or more LBT channels including at least one of one or more first LBT channels associated with a scheduling grant or one or more second LBT channels unassociated with the scheduling grant; and transmit, to a scheduling node, a LBT status report indicative of the status of each LBT channel in the set of one or more LBT channels.

In a second aspect of the disclosure, a method, a computer-readable medium, and an apparatus are provided. The apparatus may receive, from a scheduled node, a LBT status report indicative of a status of each LBT channel in a first set of one or more LBT channels, the first set of one or more LBT channels including at least one of one or more first LBT channels associated with a first scheduling grant or one or more second LBT channels unassociated with the first scheduling grant; and schedule, via a second scheduling grant, a second set of one or more LBT channels based on the status of each LBT channel indicated in the LBT status report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
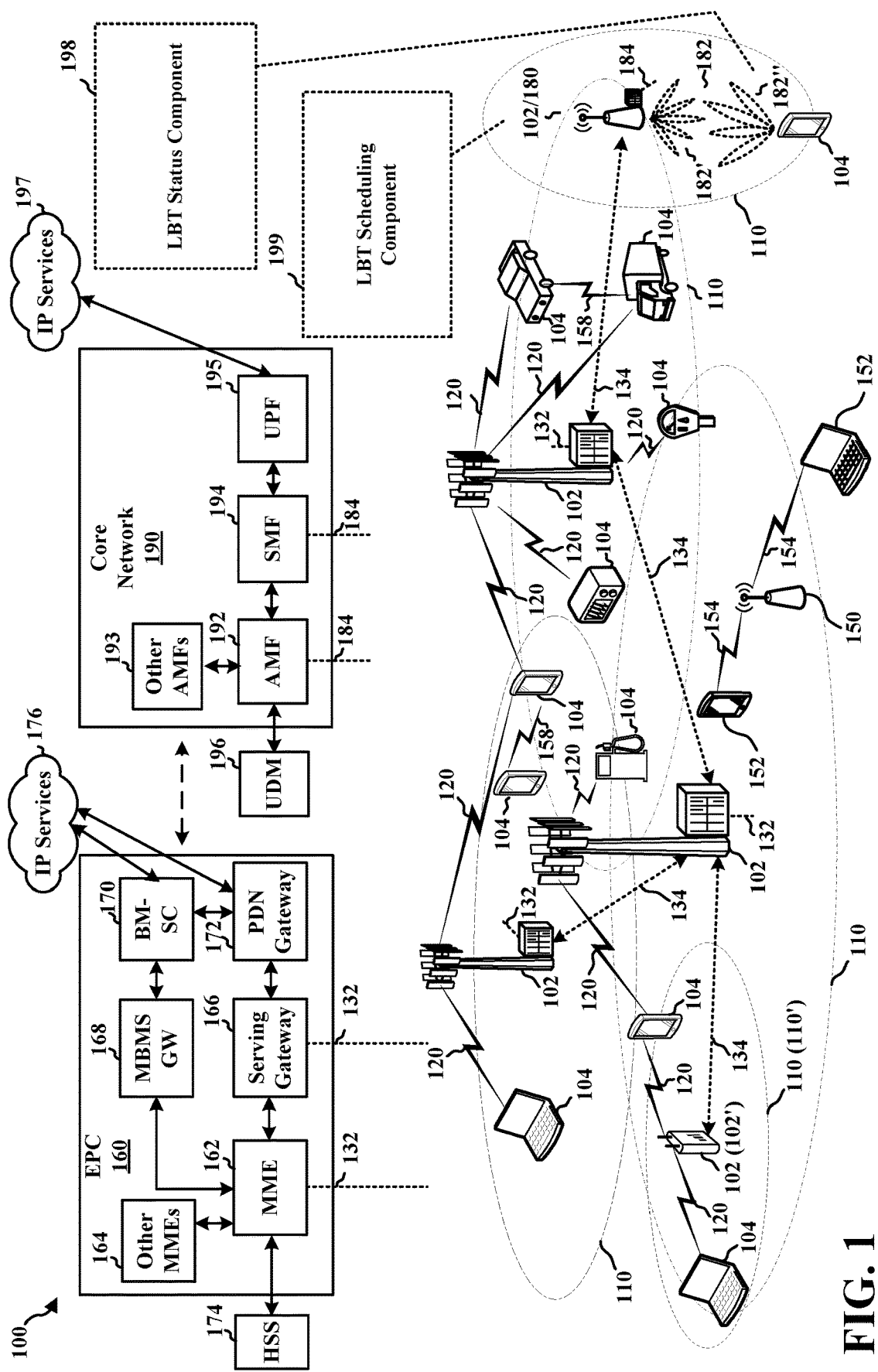
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a listen before talk (LBT) status component 198 configured to sense a status of each LBT channel in a set of one or more LBT channels, the set of one or more LBT channels including at least one of one or more first LBT channels associated with a scheduling grant or one or more second LBT channels unassociated with the scheduling grant; and transmit, to a scheduling node, a LBT status report indicative of the status of each LBT channel in the set of one or more LBT channels. In certain aspects, the base station 180 may include a LBT scheduling component 199 configured to receive, from a scheduled node, a LBT status report indicative of a status of each LBT channel in a first set of one or more LBT channels, the first set of one or more LBT channels including at least one of one or more first LBT channels associated with a first scheduling grant or one or more second LBT channels unassociated with the first scheduling grant; and schedule, via a second scheduling grant, a second set of one or more LBT channels based on the status of each LBT channel indicated in the LBT status report. Although the following description may be focused on 5G NR, the concepts described herein may be applicable to other similar areas, such as LTE, LTE-A, CDMA, GSM, and other wireless technologies.

Figure 2:
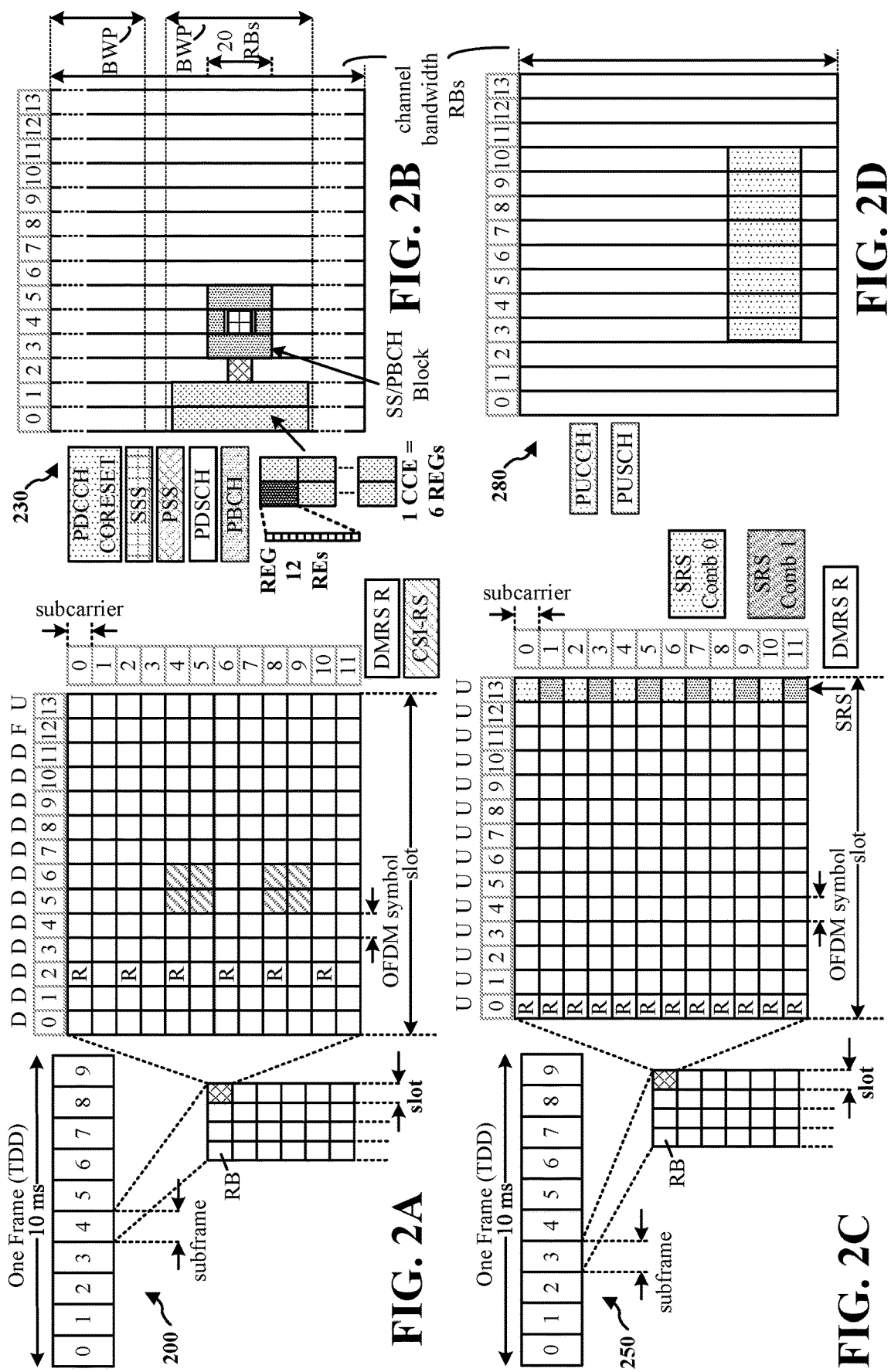
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
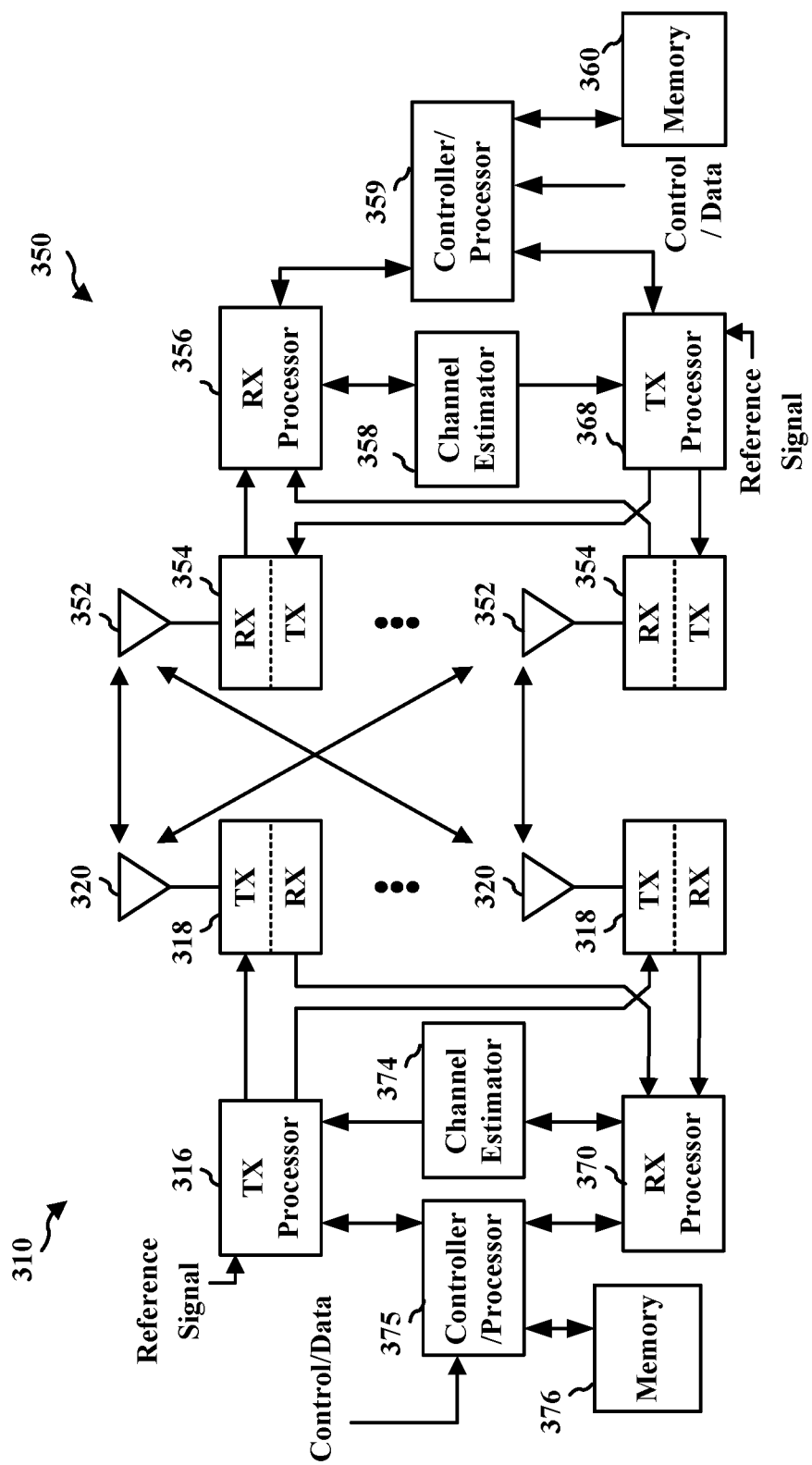
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integ-rity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the LBT status component 198 of FIG. 1.

At least one of the TX processor 316, the RX processor 370, and the controller/processor 375 may be configured to perform aspects in connection with the LBT scheduling component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
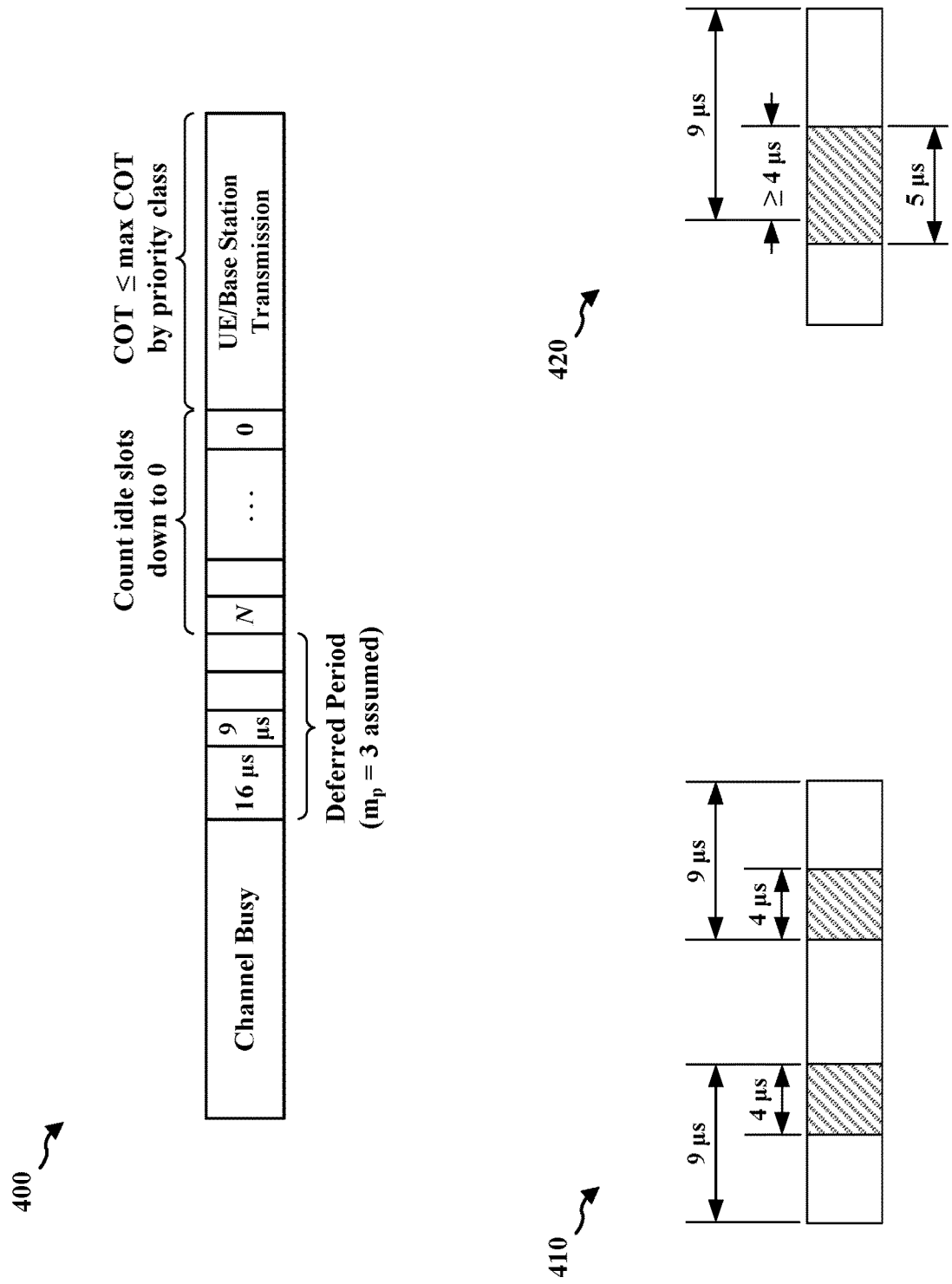
FIG. 4 illustrates diagrams of channel sensing techniques.

FIG. 4 illustrates diagrams 400-420 of channel sensing techniques. A node, such as a UE, a base station, an integrated access and backhaul (IAB) node, etc., may transmit a signal in an NR unlicensed spectrum (NR-U) if, based on channel sensing procedures, a channel is determined to include less than a threshold amount of interference. Channel sensing may be performed over a sensing slot, which may be 9 μs in duration. The sensing slot may be determined to be idle if a detected power for at least 4 μs within the sensing slot is less than an energy detection threshold. Otherwise, the sensing slot may be determined to be busy/non-idle. The energy detection threshold may be based on a transmission power bandwidth, or based on a configuration by the base station.

Different types of channel access procedures may be utilized for NR-U. For example, as illustrated in the diagram 400, channel access procedure Type 1 may be a contention window-based channel sensing procedure based on a random number of sensing slots. A consecutive number of slots (e.g., random number of consecutive slots) associated with a traffic class of traffic to be transmitted by the node may have to be determined as idle slots before the traffic may be transmitted. The number of consecutive slots may be 2-3 slots for traffic associated with a decreased transmission time. That is, a random number may be generated from 2-3 indicative of a number of idle slots that is to occur before the node may transmit.

A channel busy duration may be followed by a deferred/idle duration that is based on the traffic type. A counter for the idle slots may be initiated based on an initial random value an incremented down to 0 based on each passing slot. The counter may be stopped if the channel is determined to be busy. After the deferred/idle duration has elapsed with each slot of the duration being idle, the counter may be restarted such that the node may transmit once the counter reaches 0. Thus, the length of time associated with the deferred/idle duration may vary based on the random number generated for the slots.

Channel access procedures Type 2A (e.g., illustrated in the diagram 410), Type 2B (e.g., illustrated in the diagram 420), and Type 2C may be based on sensing procedures that include a fixed sensing time (e.g., 25 μs or 16 μs). For Type 2A, the sensing time may be 25 μs and may correspond to 2 sensing slots that comply with the energy detection threshold. For Type 2B, the sensing time may be 16 μs and may correspond to 1 sensing slot that complies with the energy detection threshold. Channel sensing may be performed over a 5 μs duration within the 16 μs sensing slot, where at least 4 μs of the channel sensing may be within a 9 μs duration of the sensing slot. For Type 2C, channel sensing may not be performed, but a gap between transmissions may be less than or equal to 16 μs. If the energy detection threshold is determined to be exceeded based on the fixed sensing time of Types 2A-2C, the node may not transmit. If the energy detection threshold is determined not to be exceeded based on the fixed sensing time of Types 2A-2C, the node may transmit.

Figure 5:
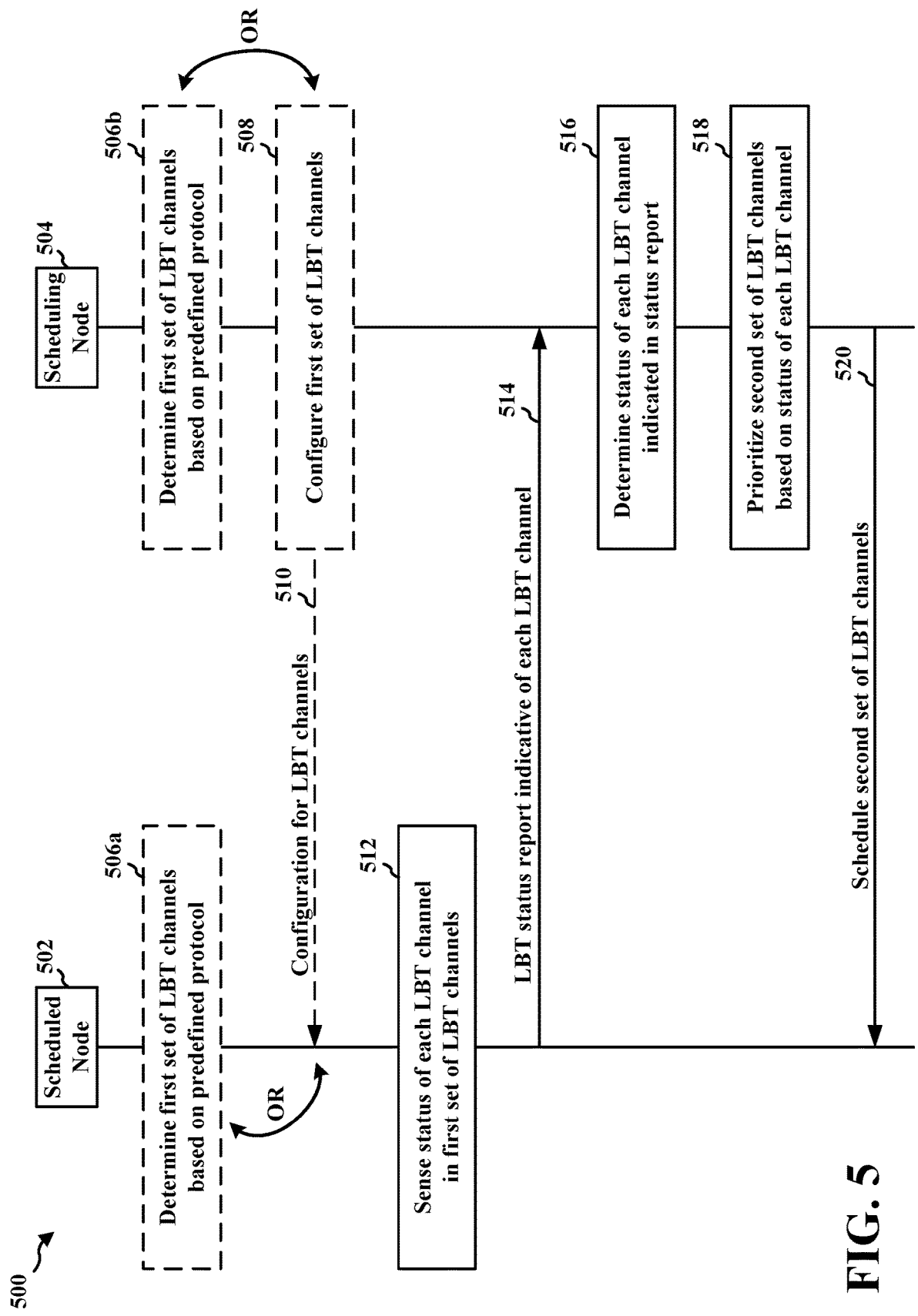
FIG. 5 is a call flow diagram illustrating communications between a scheduled node and a scheduling node.

FIG. 5 is a call flow diagram 500 illustrating communications between a scheduled node 502 and a scheduling node 504. In certain examples, the scheduled node 502 may be a UE and the scheduling node 504 may be a base station. The scheduled node 502 and the scheduling node 504 may determine, at 506a-506b, a first set of LBT channels, which may include a first subset of LBT channels associated with a scheduling grant and a second subset of LBT channels that is not associated with a scheduling grant. In further examples, the scheduling node 504 may configure the first subset of LBT channels and/or the second subset of LBT channels for the scheduled node 502. The configuration for the LBT channels may be transmitted, at 510, from the scheduling node 504 to the scheduled node 502.

At 512, the scheduled node 502 may sense a status of each LBT channel included in the first set of LBT channels. That is, the scheduled node 502 may sense, at 512, the first subset of LBT channels and/or the second subset of LBT channels to determine whether each of the LBT channels are idle or busy. The scheduled node 502 may transmit an LBT status report to the scheduling node 504, where the LBT status report is indicative of the idle or busy status of each of the LBT channels in the first set of LBT channels.

At 516, the scheduling node 504 may determine the status of each of the LBT channels indicated in the status report. At 518, the scheduling node 504 may prioritize a second set of LBT channels based on the determined status of each of the LBT channels indicated in the status report. At 520, the scheduling node 504 may schedule the scheduled node 502 with a second set of LBT channels based on the determination, at 516, of the status of each LBT channel indicated in the LBT status report and the priority assigned, at 518, to each of the LBT channels in the second set of LBT channels.

For a multi-channel LBT procedure, channel sensing may be performed in NR-U per LBT channel. An LBT channel may be configured to comply with protocols for Wi-Fi channels, which may include a maximum bandwidth of 20 MHz. For example, in some cases, NR nodes may be used in lieu of Wi-Fi nodes in unlicensed bands. Thus, channel sensing may be performed by the NR nodes per LBT channel and with a maximum bandwidth of 20 MHz to correspond to a level of granularity used by Wi-Fi nodes, when an NR node determines to use the channel/medium. An operational bandwidth for a base station or a UE may include a wider channel than 20 MHz and may include multiple LBT channels. For instance, in mmW communications the channel bandwidth may be 50 MHz, 100 MHz, 200 MHz, 400 MHz, etc., such that the operating bandwidth may include multiple LBT channels.

When a UE is scheduled for an UL transmission, the allocated bandwidth for the UL transmission may occupy an entire channel/carrier bandwidth, or part of the channel/carrier bandwidth. A sensing entity at the node may listen for noise/interference energy per LBT channel (e.g., per 20 MHz bandwidth). Thus, in some cases, a scheduled transmission may overlap with multiple LBT channels. If a scheduled grant corresponds to multiple LBT channels, the UE may transmit if the LBT procedure passes for all of the LBT channels that overlap with the allocated resources for the UL transmission. That is, all of the LBT channels may have to be below an energy detection threshold. If the LBT procedure does not pass for all of the LBT channels that overlap with the allocated resources for the UL transmission, the UE may not transmit based on the allocation corresponding to the multiple LBT channels.

The UE may randomly select one LBT channel from the multiple LBT channels to perform the Type 1 channel access procedure, which may include a random number of sensing slots. If the Type 1 channel access procedure passes, the UE may subsequently perform one or more Type 2 channel access procedures, which may include a fixed sensing time (e.g., shortened sensing) for the remaining LBT channels. In this manner, the UE may determine whether all of the LBT channels pass or fail the LBT procedure. If all of the channels pass, the UE may transmit on UL. However, if any of the LBT channels fail, the UE may not proceed to transmit on UL.

Without an UL LBT status report, a base station may determine coarse information about the status of the scheduled LBT channels. That is, if an UL transmission is received from the UE, the base station may determine that all of the scheduled LBT channels are idle (e.g., interference from other nodes is below a threshold level). However, the base station may not determine the status of other LBT channels that are not included as part of the scheduling grant for the UL transmission. For example, if an entire carrier includes 10 LBT channels and the UE is scheduled to transmit over 2 of the 10 LBT channels, the base station may determine that all of the 2 LBT channels are idle when the base station receives the UL transmission from the UE, as the UE may not send the UL transmission if one or both of the 2 LBT channels are busy/non-idle.

If the UL transmission is not received from the UE, the base station may determine that at least one of the scheduled LBT channels is busy/non-idle (e.g., interference from other nodes is above the threshold). However, the base station may not be configured to determine which LBT channels are busy/non-idle and which, if any, LBT channels are idle. The base station may determine that at least one of the LBT channels is busy/non-idle when the base station does not receive the UL transmission. In further examples, the base station may also lack a mechanism for determining the status of the remaining 8 LBT channels that are outside the scheduling grant, but included in the 10 LBT channels of the carrier.

The UE may perform channel sensing prior to transmission to determine whether one or more channels are idle or busy. While the UE may be scheduled to transmit on a subset of LBT channels of a carrier for which channel sensing may be performed, the UE may also sense LBT channels that are outside the subset of LBT channels. For instance, the UE may perform channel sensing for UL transmission over the entire bandwidth of a carrier, including LBT channels that are not part of the scheduling grant. For example, the entire bandwidth may extend over NLBT channels for which the UE may be scheduled to perform UL transmissions based on M<NLBT channels. Nevertheless, the UE may sense all NLBT channels to determine whether the NLBT channels are idle. The UE may report, to the base station, a status for each LBT channel of the entire bandwidth via the UL transmission. Based on the status report, the base station may determine which LBT channels of the bandwidth have an increased likelihood of passing a future LBT procedure, and schedule such LBT channels for a next/future UL transmission.

An UL LBT status report may be signaled from the UE to the base station. The UL LBT status report may be indicative of the status of each LBT channel included in a reporting set. The status of the LBT channel may include one or more of whether the LBT channel passed the LBT procedure, a detected energy level, which may be indicated in all reports or for certain trigger conditions (e.g., failed LBT procedure), a time that the LBT channel sensing was performed, etc.

In aspects, the reporting set may be all of the LBT channels included in the entire bandwidth, or a subset of the LBT channels of the bandwidth. The subset of LBT channels may be configured by the base station or determined based on a predefined protocol (e.g., the subset may include LBT channels that are not used for UL transmission of the status report). The base station may determine that the scheduled LBT channels have passed the LBT procedure based on receiving the UL transmission. Therefore, the status report may correspond to non-scheduled LBT channels. The UL LBT status report may be triggered by the base station via DCI grant or MAC-control element (MAC-CE), or independently by the UE via an UL configured grant (CG). In some cases, an RRC configuration may enable/disable UL LBT status reporting by the UE. The UL LBT status report may be transmitted with physical layer control information via PUCCH and/or PUSCH, or as an UL MAC-CE.

The base station may perform scheduling determinations for subsequent UL transmission based on receiving the UL LBT status report. The scheduling determinations may increase a reliability of the LBT procedure at the UE. For example, the base station may prioritize scheduling of LBT channels that were reported as idle in the status report.

Figure 6:
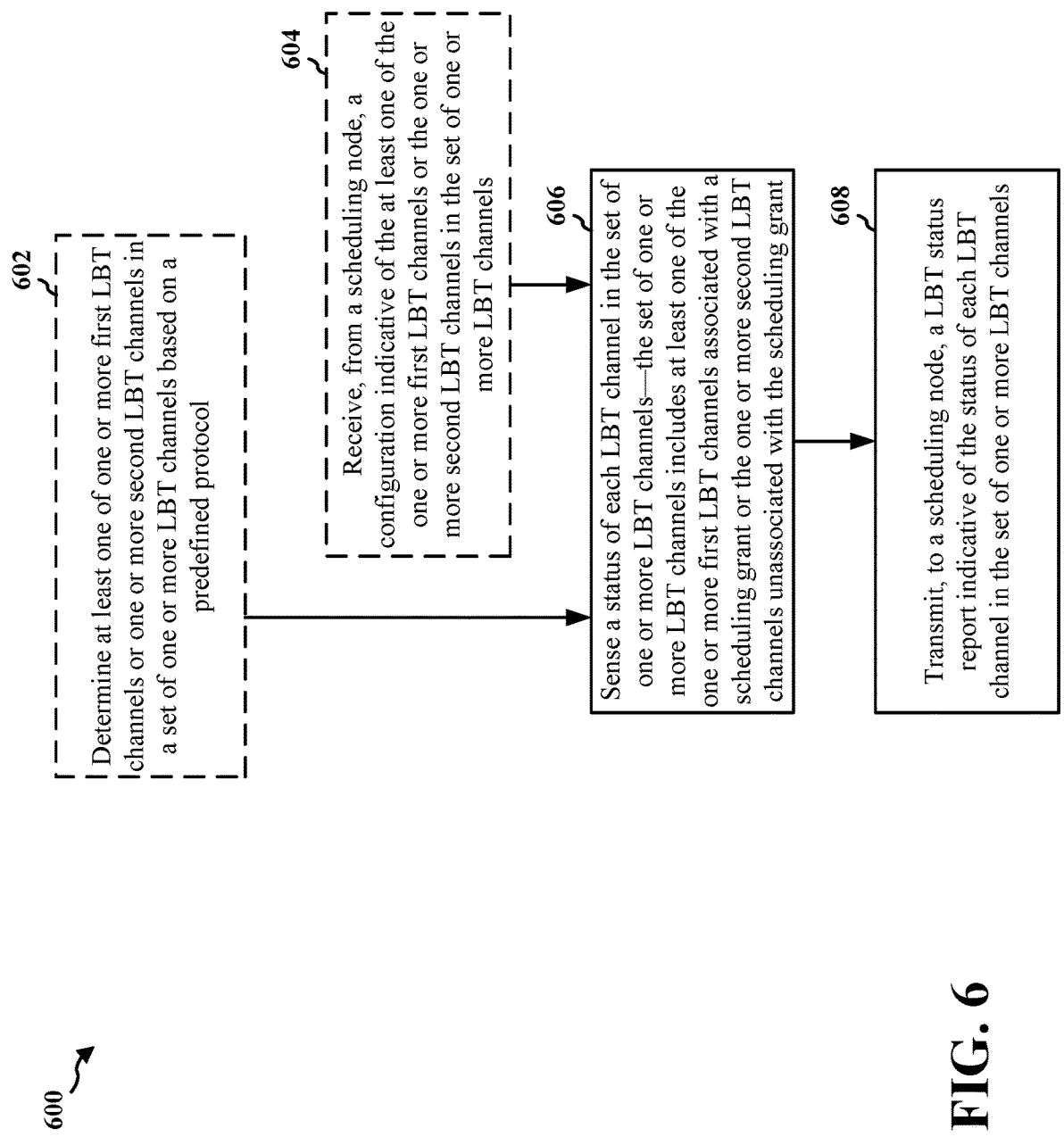
FIG. 6 is a flowchart of a method of wireless communication at a scheduled node.

FIG. 6 is a flowchart 600 of a method of wireless communication. The method may be performed by a scheduled node (e.g., the UE 104; the scheduled node 502; the apparatus 802; etc.), which may include the memory 360 and which may be the entire UE 104/scheduled node 502, or a component of the UE 104/scheduled node 502, such as the TX processor 368, the RX processor 356, and/or the controller/processor 359.

At 602, the scheduled node may determine at least one of one or more first LBT channels or one or more second LBT channels in a set of one or more LBT channels based on a predefined protocol. For example, referring to FIG. 5, the scheduled node 502 may determine, at 506a, a first set of LBT channels based on a predefined protocol. The determination may be performed by the determination component 840 in the apparatus 802 in FIG. 8.

At 604, the scheduled node may alternatively receive, from a scheduling node, a configuration indicative of the at least one of the one or more first LBT channels or the one or more second LBT channels in the set of one or more LBT channels. For example, referring to FIG. 5, the scheduled node 502 may receive, at 510, from the scheduling node 504 a configuration for the LBT channels included in the first set of LBT channels. The reception may be performed by the reception component 830 in the apparatus 802 in FIG. 8.

At 606, the scheduled node may sense a status of each LBT channel in the set of one or more LBT channels—the set of one or more LBT channels includes at least one of the one or more first LBT channels associated with a scheduling grant or the one or more second LBT channels unassociated with the scheduling grant. For example, referring to FIG. 5, the scheduled node 502 may sense, at 512, a status of each LBT channel in the first set of LBT channels. In aspects, a second set of one or more LBT channels may be associated with a second scheduling grant based on an LBT status report. The sensing may be performed by the sensor component 842 in the apparatus 802 in FIG. 8.

At 608, the scheduled node may transmit, to a scheduling node, a LBT status report indicative of the status of each LBT channel in the set of one or more LBT channels. For example, referring to FIG. 5, the scheduled node 502 may transmit, at 514, the LBT status report indicative of each LBT channel to the scheduling node 504. In aspects, the scheduled node 502 may be a UE and the scheduling node 504 may be a base station. The status indicated (e.g., at 514) in the LBT status report may be indicative of at least one of whether each LBT channel is in an idle state, an energy level of each LBT channel, or a time that each LBT channel was sensed. The energy level of each LBT channel may be indicated (e.g., at 514) in the LBT status report based on each LBT channel being in a non-idle state. Transmission, at 514, of the LBT status report may be triggered based on at least one of a DCI grant, a MAC-CE, or a RRC configuration. Further, the LBT status report may be transmitted, at 514, based on at least one of a PUCCH, a PUSCH, or an UL MAC-CE. The transmission may be performed by the transmission component 834 in the apparatus 802 in FIG. 8.

Figure 7:
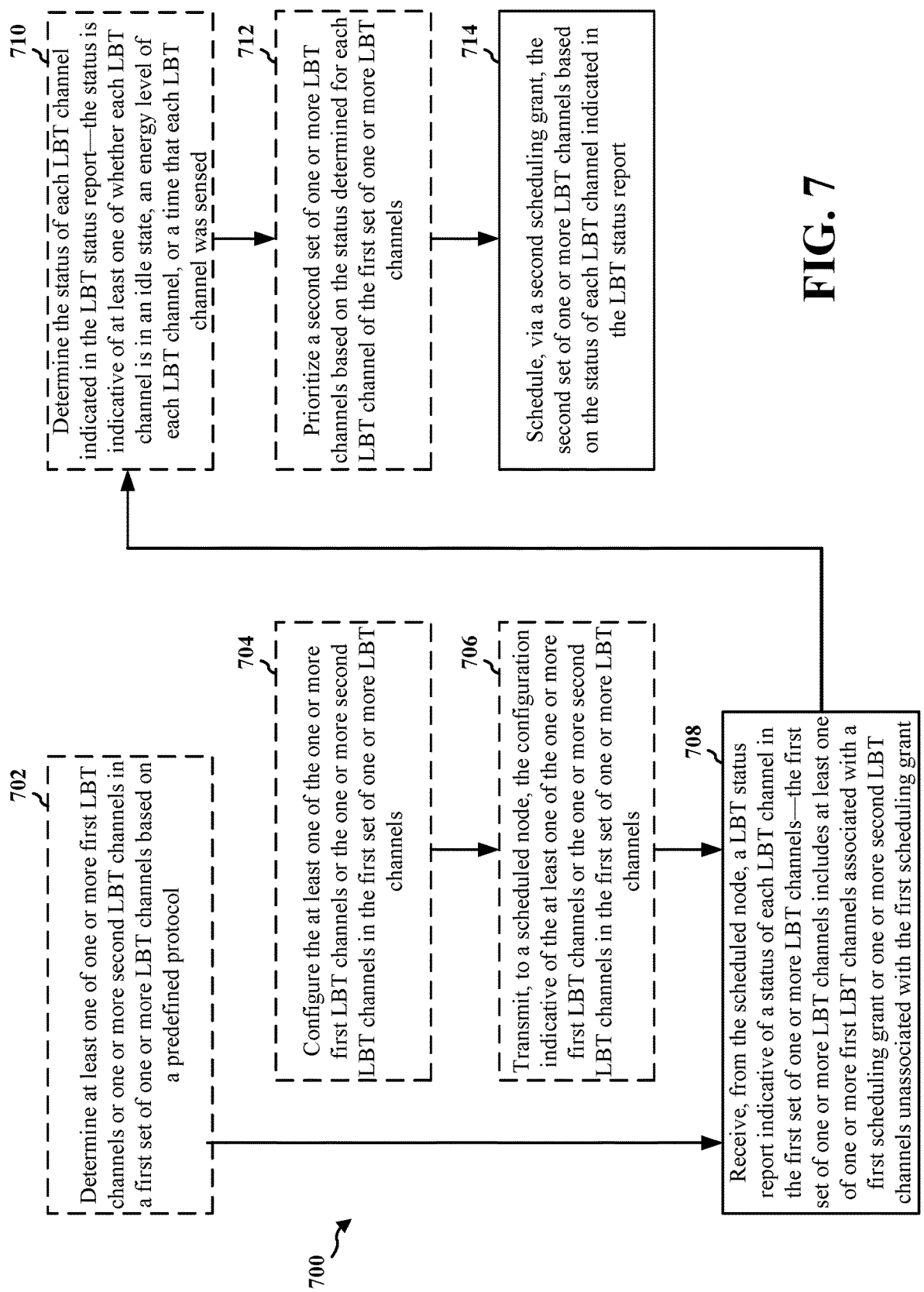
FIG. 7 is a flowchart of a method of wireless communication at a scheduling node.

FIG. 7 is a flowchart 700 of a method of wireless communication. The method may be performed by a scheduling node (e.g., the base station 102; the scheduling node 504; the apparatus 902; etc.), which may include the memory 376 and which may be the entire base station 102/scheduling node 504, or a component of the base station 102/scheduling node 504, such as the TX processor 316, the RX processor 370, and/or the controller/processor 375.

At 702, the scheduling node may determine at least one of one or more first LBT channels or one or more second LBT channels in a first set of one or more LBT channels based on a predefined protocol. For example, referring to FIG. 5, the scheduling node 504 may determine, at 506b, a first set of LBT channels based on a predefined protocol. The determination may be performed by the determination component 940 in the apparatus 902 in FIG. 9.

At 704, the scheduling node may alternatively configure the at least one of the one or more first LBT channels or the one or more second LBT channels in the first set of one or more LBT channels. For example, referring to FIG. 5, the scheduling node 504 may configure, at 508, the first set of LBT channels. The configuration may be performed by the configuration component 942 in the apparatus 902 in FIG. 9.

At 706, the scheduling node may transmit, to a scheduled node, the configuration indicative of the at least one of the one or more first LBT channels or the one or more second LBT channels in the first set of one or more LBT channels. For example, referring to FIG. 5, the scheduling node 504 may transmit, at 510, a configuration to the scheduled node 502 for LBT channels included in the first set of one or more LBT channels. In examples, the scheduled node may be a UE and the scheduling node may be a base station. The transmitting may be performed by the transmission component 934 in the apparatus 902 in FIG. 9.

At 708, the scheduling node may receive, from the scheduled node, a LBT status report indicative of a status of each LBT channel in the first set of one or more LBT channels—the first set of one or more LBT channels includes at least one of one or more first LBT channels associated with a first scheduling grant or one or more second LBT channels unassociated with the first scheduling grant. For example, referring to FIG. 5, the scheduling node 504 may receive, at 514, an LBT status report from the scheduled node 502 indicative of a status of each LBT channel in the first set of LBT channels. The LBT status report may be received, at 514, based on at least one of a PUCCH, a PUSCH, or an UL MAC-CE. The receiving may be performed by the reception component 930 in the apparatus 902 in FIG. 9.

At 710, the scheduling node may determine the status of each LBT channel indicated in the LBT status report—the status is indicative of at least one of whether each LBT channel is in an idle state, an energy level of each LBT channel, or a time that each LBT channel was sensed. For example, referring to FIG. 5, the scheduling node 504 may determine, at 516, a status of each LBT channel indicated in the status report received, at 516. In aspects, the energy level of each LBT channel may be indicated, at 514, in the LBT status report based on each LBT channel being in a non-idle state. The determination may be performed by the determination component 940 in the apparatus 902 in FIG. 9.

At 712, the scheduling node may prioritize a second set of one or more LBT channels based on the status determined for each LBT channel of the first set of one or more LBT channels. For example, referring to FIG. 5, the scheduling node 504 may prioritize, at 518, a second set of LBT channels based on the status of each LBT channel indicated in the LBT status report. The prioritizing may be performed by the prioritization component 944 in the apparatus 902 in FIG. 9.

At 714, the scheduling node may schedule, via a second scheduling grant, the second set of one or more LBT channels based on the status of each LBT channel indicated in the LBT status report. For example, referring to FIG. 5, the scheduling node 504 may schedule, at 520, the second set of LBT channels based on the priority determined, at 518, for the second set of LBT channels and the status determined, at 516, for each LBT channel indicated in the status report. The scheduling may be performed by the scheduler component 946 in the apparatus 902 in FIG. 9.

Figure 8:
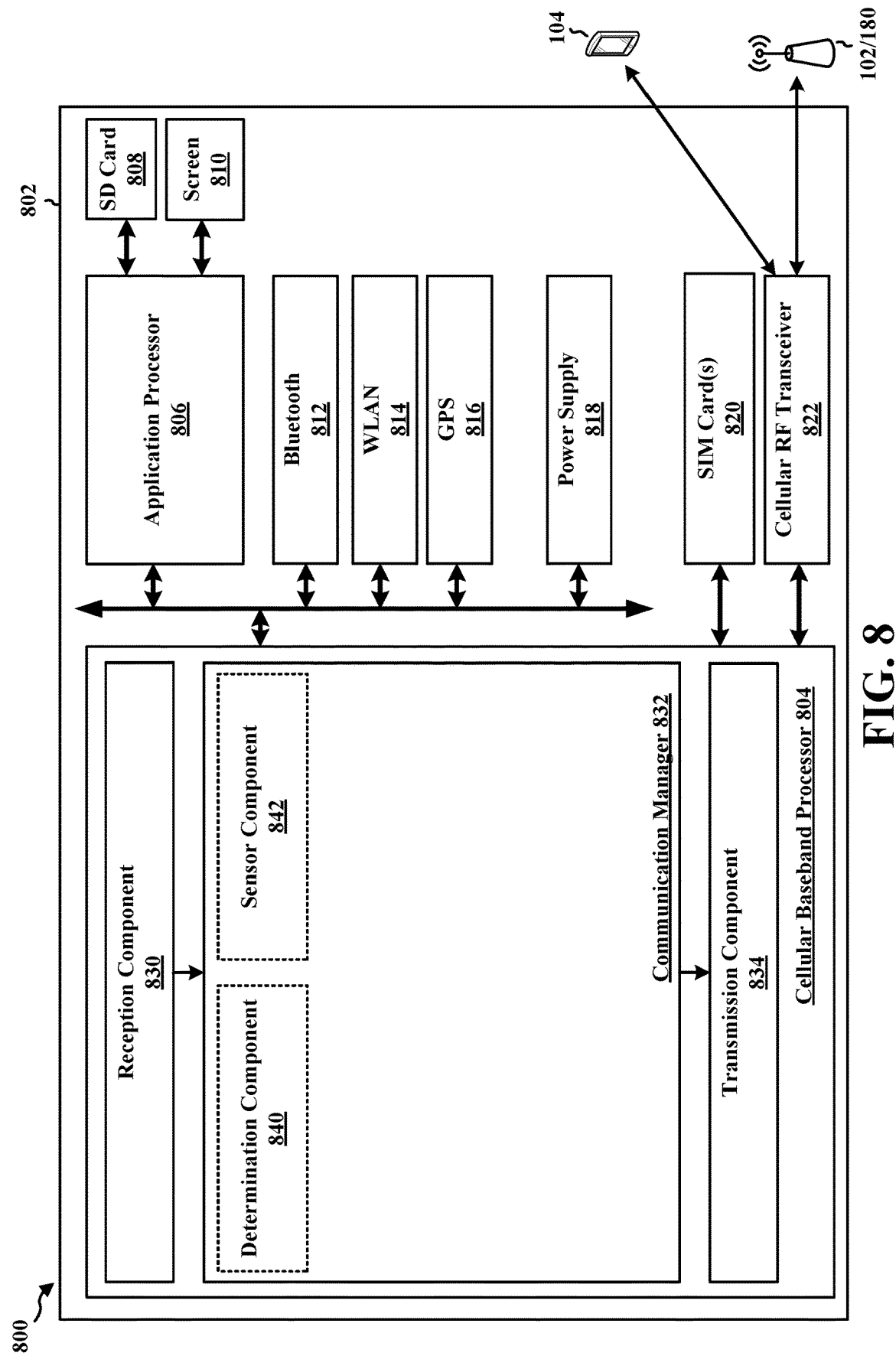
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a determination component 840 that is configured, e.g., as described in connection with 602, determine at least one of one or more first LBT channels or one or more second LBT channels in a set of one or more LBT channels based on a predefined protocol. The communication manager 832 further includes a sensor component 842 that is configured, e.g., as described in connection with 606, to sense a status of each LBT channel in the set of one or more LBT channels—the set of one or more LBT channels includes at least one of the one or more first LBT channels associated with a scheduling grant or the one or more second LBT channels unassociated with the scheduling grant.

The reception component 830 is configured, e.g., as described in connection with 604, to receive, from a scheduling node, a configuration indicative of the at least one of the one or more first LBT channels or the one or more second LBT channels in the set of one or more LBT channels. The transmission component 834 is configured, e.g., as described in connection with 608, to transmit, to a scheduling node, a LBT status report indicative of the status of each LBT channel in the set of one or more LBT channels.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for sensing a status of each LBT channel in a set of one or more LBT channels, the set of one or more LBT channels including at least one of one or more first LBT channels associated with a scheduling grant or one or more second LBT channels unassociated with the scheduling grant; and means for transmitting, to a scheduling node, a LBT status report indicative of the status of each LBT channel in the set of one or more LBT channels. The apparatus 802 further includes means for receiving, from the scheduling node, a configuration indicative of the at least one of the one or more first LBT channels or the one or more second LBT channels in the set of one or more LBT channels. The apparatus 802 further includes means for determining the at least one of the one or more first LBT channels or the one or more second LBT channels in the set of one or more LBT channels based on a predefined protocol.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
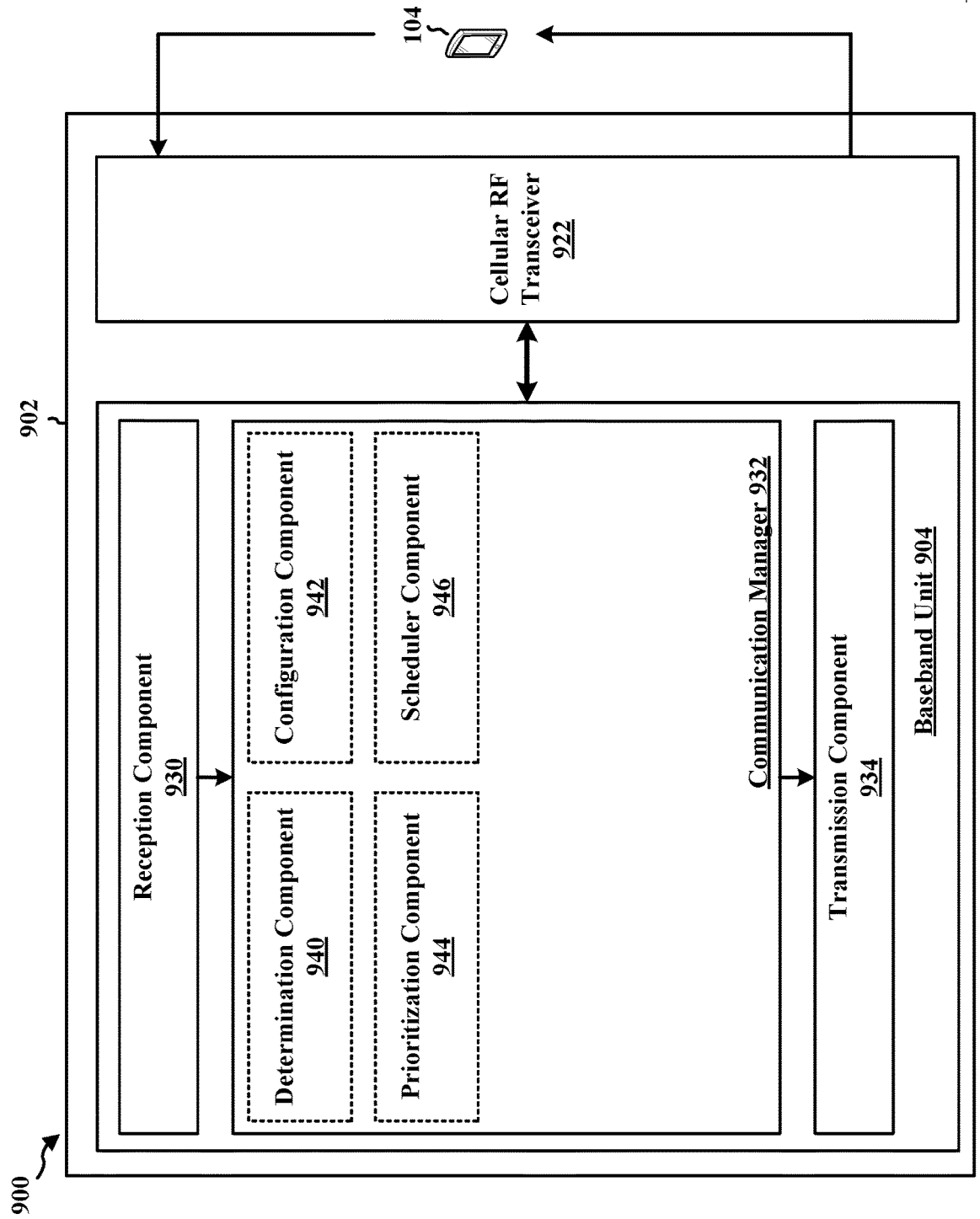
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a determination component 940 that is configured, e.g., as described in connection with 702 and 710, to determine at least one of one or more first LBT channels or one or more second LBT channels in a first set of one or more LBT channels based on a predefined protocol; and to determine the status of each LBT channel indicated in the LBT status report—the status is indicative of at least one of whether each LBT channel is in an idle state, an energy level of each LBT channel, or a time that each LBT channel was sensed. The communication manager 932 further includes a configuration component 942 that is configured, e.g., as described in connection with 704, to configure the at least one of the one or more first LBT channels or the one or more second LBT channels in the first set of one or more LBT channels. The communication manager 932 further includes a prioritization component 944 that is configured, e.g., as described in connection with 712, to prioritize a second set of one or more LBT channels based on the status determined for each LBT channel of the first set of one or more LBT channels. The communication manager 932 further includes a scheduler component 946 that is configured, e.g., as described in connection with 946, to schedule, via a second scheduling grant, the second set of one or more LBT channels based on the status of each LBT channel indicated in the LBT status report.

The reception component 930 is configured, e.g., as described in connection with 708, to receive, from the scheduled node, a LBT status report indicative of a status of each LBT channel in the first set of one or more LBT channels—the first set of one or more LBT channels includes at least one of one or more first LBT channels associated with a first scheduling grant or one or more second LBT channels unassociated with the first scheduling grant. The transmission component 934 is configured, e.g., as described in connection with 706, to transmit, to a scheduled node, the configuration indicative of the at least one of the one or more first LBT channels or the one or more second LBT channels in the first set of one or more LBT channels.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a scheduled node, a LBT status report indicative of a status of each LBT channel in a first set of one or more LBT channels, the first set of one or more LBT channels including at least one of one or more first LBT channels associated with a first scheduling grant or one or more second LBT channels unassociated with the first scheduling grant; and means for scheduling, via a second scheduling grant, a second set of one or more LBT channels based on the status of each LBT channel indicated in the LBT status report. The apparatus 902 further includes means for determining the status of each LBT channel indicated in the LBT status report, where the status is indicative of at least one of whether each LBT channel is in an idle state, an energy level of each LBT channel, or a time that each LBT channel was sensed. The apparatus 902 further includes means for prioritizing the second set of one or more LBT channels based on the status determined for each LBT channel of the first set of one or more LBT channels. The apparatus 902 further includes means for configuring the at least one of the one or more first LBT channels or the one or more second LBT channels in the first set of one or more LBT channels. The apparatus 902 further includes means for transmitting, to the scheduled node, a configuration indicative of the at least one of the one or more first LBT channels or the one or more second LBT channels in the first set of one or more LBT channels. The apparatus 902 further includes means for determining the at least one of the one or more first LBT channels or the one or more second LBT channels in the first set of one or more LBT channels based on a predefined protocol.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a scheduled node, including: sensing a status of each LBT channel in a set of one or more LBT channels, the set of one or more LBT channels including at least one of one or more first LBT channels associated with a scheduling grant or one or more second LBT channels unassociated with the scheduling grant; and transmitting, to a scheduling node, a LBT status report indicative of the status of each LBT channel in the set of one or more LBT channels.

Aspect 2 may be combined with aspect 1 and includes that the status indicated in the LBT status report is indicative of at least one of whether each LBT channel is in an idle state, an energy level of each LBT channel, or a time that each LBT channel was sensed.

Aspect 3 may be combined with any of aspects 1-2 and includes that the energy level of each LBT channel is indicated in the LBT status report based on each LBT channel being in a non-idle state.

Aspect 4 may be combined with any of aspects 1-3 and further includes receiving, from the scheduling node, a configuration indicative of the at least one of the one or more first LBT channels or the one or more second LBT channels in the set of one or more LBT channels.

Aspect 5 may be combined with any of aspects 1-3 and further includes determining the at least one of the one or more first LBT channels or the one or more second LBT channels in the set of one or more LBT channels based on a predefined protocol.

Aspect 6 may be combined with any of aspects 1-5 and includes that transmission of the LBT status report is triggered based on at least one of a DCI grant, a MAC-CE, or a RRC configuration.

Aspect 7 may be combined with any of aspects 1-6 and includes that the LBT status report is transmitted based on at least one of a PUCCH, a PUSCH, or an UL MAC-CE.

Aspect 8 may be combined with any of aspects 1-7 and includes that a second set of one or more LBT channels is associated with a second scheduling grant based on the LBT status report.

Aspect 9 may be combined with any of aspects 1-8 and includes that the scheduled node is a UE and the scheduling node is a base station.

Aspect 10 is a method of wireless communication at a scheduling node, including: receiving, from a scheduled node, a LBT status report indicative of a status of each LBT channel in a first set of one or more LBT channels, the first set of one or more LBT channels including at least one of one or more first LBT channels associated with a first scheduling grant or one or more second LBT channels unassociated with the first scheduling grant; and scheduling, via a second scheduling grant, a second set of one or more LBT channels based on the status of each LBT channel indicated in the LBT status report.

Aspect 11 may be combined with aspect 10 and further includes determining the status of each LBT channel indicated in the LBT status report, where the status is indicative of at least one of whether each LBT channel is in an idle state, an energy level of each LBT channel, or a time that each LBT channel was sensed.

Aspect 12 may be combined with any of aspects 10-11 and further includes prioritizing the second set of one or more LBT channels based on the status determined for each LBT channel of the first set of one or more LBT channels.

Aspect 13 may be combined with any of aspects 10-12 and includes that the energy level of each LBT channel is indicated in the LBT status report based on each LBT channel being in a non-idle state.

Aspect 14 may be combined with any of aspects 10-13 and further includes configuring the at least one of the one or more first LBT channels or the one or more second LBT channels in the first set of one or more LBT channels.

Aspect 15 may be combined with any of aspects 10-14 and further includes transmitting, to the scheduled node, a configuration indicative of the at least one of the one or more first LBT channels or the one or more second LBT channels in the first set of one or more LBT channels.

Aspect 16 may be combined with any of aspects 10-14 and further includes determining the at least one of the one or more first LBT channels or the one or more second LBT channels in the first set of one or more LBT channels based on a predefined protocol.

Aspect 17 may be combined with any of aspects 10-16 and includes that the LBT status report is received based on at least one of a PUCCH, a PUSCH, or an UL MAC-CE.

Aspect 18 may be combined with any of aspects 10-17 and includes that the scheduled node is a UE and the scheduling node is a base station.

Aspect 19 is an apparatus for wireless communication including at least one processor coupled to a memory and configured to implement a method as in any of aspects 1-18.

Aspect 20 is an apparatus for wireless communication including means for implementing a method as in any of aspects 1-18.

Aspect 21 is a computer-readable medium storing computer executable code, the code when executed by at least one processor causes the at least one processor to implement a method as in any of aspects 1-18.

What is claimed is:

1. An apparatus for wireless communication at a scheduled node, comprising:
   a memory; and
   at least one processor coupled to the memory and configured to:
   sense a status of each listen before talk (LBT) channel in a set of one or more LBT channels, the set of one or more LBT channels including one or more first LBT channels associated with a scheduling grant and one or more second LBT channels unassociated with the scheduling grant; and
   transmit, to a scheduling node, a LBT status report indicative of the status of each LBT channel in the set of one or more LBT channels, wherein the status indicated in the LBT status report is indicative of whether each LBT channel is in an idle state, an energy level of each LBT channel, and a time that each LBT channel was sensed, and wherein the energy level of each LBT channel is indicated in the LBT status report based on each LBT channel being in a non-idle state.

2. The apparatus of claim 1, wherein the at least one processor is further configured to receive, from the scheduling node, a configuration indicative of the one or more first LBT channels and the one or more second LBT channels in the set of one or more LBT channels.

3. The apparatus of claim 1, wherein the at least one processor is further configured to determine the one or more first LBT channels and the one or more second LBT channels in the set of one or more LBT channels.

4. The apparatus of claim 1, wherein transmission of the LBT status report is triggered based on at least one of a downlink control information (DCI) grant, a medium access control-control element (MAC-CE), or a radio resource control (RRC) configuration.

5. The apparatus of claim 1, wherein to transmit the LBT status report, the at least one processor is configured to transmit the LBT status report based on at least one of a physical uplink control channel (PUCCH), a physical uplink shared channel (PUSCH), or an uplink (UL) medium access control-control element (MAC-CE).

6. The apparatus of claim 1, wherein a second set of one or more LBT channels is associated with a second scheduling grant based on the LBT status report.

7. The apparatus of claim 1, wherein the scheduled node is a user equipment (UE) and the scheduling node is a base station.

8. An apparatus for wireless communication at a scheduling node, comprising:
   a memory; and
   at least one processor coupled to the memory and configured to:
   receive, from a scheduled node, a listen before talk (LBT) status report indicative of a status of each LBT channel in a first set of one or more LBT channels, the first set of one or more LBT channels including one or more first LBT channels associated with a first scheduling grant and one or more second LBT channels unassociated with the first scheduling grant, wherein the status indicated in the LBT status report is indicative of whether each LBT channel is in an idle state, an energy level of each LBT channel, and a time that each LBT channel was sensed, and wherein the energy level of each LBT channel is indicated in the LBT status report based on each LBT channel being in a non-idle state; and
   schedule, via a second scheduling grant, a second set of one or more LBT channels based on the status of each LBT channel indicated in the LBT status report.

9. The apparatus of claim 8, wherein the at least one processor is further configured to determine the status of each LBT channel indicated in the LBT status report.

10. The apparatus of claim 9, wherein the at least one processor is further configured to prioritize the second set of one or more LBT channels based on the status determined for each LBT channel of the first set of one or more LBT channels.

11. The apparatus of claim 8, wherein the at least one processor is further configured to configure the one or more first LBT channels and the one or more second LBT channels in the first set of one or more LBT channels.

12. The apparatus of claim 11, wherein the at least one processor is further configured to transmit, to the scheduled node, a configuration indicative of the one or more first LBT channels and the one or more second LBT channels in the first set of one or more LBT channels.

13. The apparatus of claim 8, wherein the at least one processor is further configured to determine the one or more first LBT channels and the one or more second LBT channels in the first set of one or more LBT channels.

14. The apparatus of claim 8, wherein to receive the LBT status report, the at least one processor is configured to receive the LBT status report based on at least one of a physical uplink control channel (PUCCH), a physical uplink shared channel (PUSCH), or an uplink (UL) medium access control-control element (MAC-CE).

15. The apparatus of claim 8, wherein the scheduled node is a user equipment (UE) and the scheduling node is a base station.

16. A method of wireless communication at a scheduled node, comprising:
   sensing a status of each listen before talk (LBT) channel in a set of one or more LBT channels, the set of one or more LBT channels including one or more first LBT channels associated with a scheduling grant and one or more second LBT channels unassociated with the scheduling grant; and
   transmitting, to a scheduling node, a LBT status report indicative of the status of each LBT channel in the set of one or more LBT channels, wherein the status indicated in the LBT status report is indicative of whether each LBT channel is in an idle state, an energy level of each LBT channel, and a time that each LBT channel was sensed, and wherein the energy level of each LBT channel is indicated in the LBT status report based on each LBT channel being in a non-idle state.

17. The method of claim 16, further comprising receiving, from the scheduling node, a configuration indicative of the one or more first LBT channels and the one or more second LBT channels in the set of one or more LBT channels.

18. The method of claim 16, further comprising determining the one or more first LBT channels and the one or more second LBT channels in the set of one or more LBT channels.

19. The method of claim 16, wherein transmission of the LBT status report is triggered based on at least one of a downlink control information (DCI) grant, a medium access control-control element (MAC-CE), or a radio resource control (RRC) configuration.

20. The method of claim 16, wherein a second set of one or more LBT channels is associated with a second scheduling grant based on the LBT status report.

21. A method of wireless communication at a scheduling node, comprising:
   receiving, from a scheduled node, a listen before talk (LBT) status report indicative of a status of each LBT channel in a first set of one or more LBT channels, the first set of one or more LBT channels including one or more first LBT channels associated with a first scheduling grant and one or more second LBT channels unassociated with the first scheduling grant, wherein the status indicated in the LBT status report is indicative of whether each LBT channel is in an idle state, an energy level of each LBT channel, and a time that each LBT channel was sensed, and wherein the energy level of each LBT channel is indicated in the LBT status report based on each LBT channel being in a non-idle state; and
   scheduling, via a second scheduling grant, a second set of one or more LBT channels based on the status of each LBT channel indicated in the LBT status report.

22. The method of claim 21, further comprising determining the status of each LBT channel indicated in the LBT status report.

23. The method of claim 22, further comprising prioritizing the second set of one or more LBT channels based on the status determined for each LBT channel of the first set of one or more LBT channels.

24. The method of claim 21, further comprising configuring the one or more first LBT channels and the one or more second LBT channels in the first set of one or more LBT channels.

25. The method of claim 24, further comprising transmitting, to the scheduled node, a configuration indicative of the one or more first LBT channels and the one or more second LBT channels in the first set of one or more LBT channels.

26. The method of claim 21, further comprising determining the one or more first LBT channels and the one or more second LBT channels in the first set of one or more LBT channels.

* * * * *